(12) United States Patent
Shetty et al.

(10) Patent No.: US 11,816,346 B2
(45) Date of Patent: Nov. 14, 2023

(54) METHOD AND APPARATUS FOR PLANNING AND COORDINATING BLOCK DATA MIGRATION BETWEEN DISPARATE STORAGE SYSTEMS

(71) Applicant: Dell Products, L.P., Hopkinton, MA (US)

(72) Inventors: Vijesh Shetty, Bangalore (IN); Sivashankari Chandrasekaran, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 198 days.

(21) Appl. No.: 17/488,425

(22) Filed: Sep. 29, 2021

(65) Prior Publication Data

US 2023/0110631 A1  Apr. 13, 2023

(51) Int. Cl.
*G06F 3/00* (2006.01)
*G06F 3/06* (2006.01)
*G06F 8/65* (2018.01)

(52) U.S. Cl.
CPC .......... *G06F 3/0647* (2013.01); *G06F 3/0604* (2013.01); *G06F 3/0679* (2013.01); *G06F 8/65* (2013.01)

(58) Field of Classification Search
CPC .................................................. G06F 3/0647
See application file for complete search history.

(56) References Cited

U.S. PATENT DOCUMENTS

| 7,376,764 B1* | 5/2008 | Todd ..................... G06F 3/0605 711/100 |
| 9,058,119 B1* | 6/2015 | Ray, III .................. H04L 12/00 |
| 2020/0034192 A1* | 1/2020 | Kandula ............... G06F 9/4856 |
| 2021/0081379 A1* | 3/2021 | Buehne ................. G06F 16/275 |
| 2021/0241131 A1* | 8/2021 | Khawas .................... G06N 3/08 |

* cited by examiner

*Primary Examiner* — Reginald G Bragdon
*Assistant Examiner* — Michael L Westbrook
(74) *Attorney, Agent, or Firm* — Anderson Gorecki LLP

(57) ABSTRACT

A data migration orchestration system includes a data migration orchestration engine, a user interface, and an orchestration configuration database. The user interface provides a menu-based system configured to guide a user through a process of implementing a data migration instance. The orchestration configuration database contains information about the types of data migration technologies available to be used to implement data migration operations between disparate storage systems. The data migration orchestration engine has a storage environment capture module to capture configuration information about the source and target storage environments, a storage environment analysis engine configured to generate a ranked list of data migration technologies that can be used to implement the data migration operation, a block data migration preparation module to prepare the source and target storage environments, and a block data migration execution module to automatically implement the data migration operation and rollback, if the data migration operation isn't successful.

18 Claims, 14 Drawing Sheets

FIG. 7A

Migration method profiling database 700

| Migration method | Process | Benefits | Limitations | Cost |
|---|---|---|---|---|
| RDF (Remote Data Facility) | Storage Level | Proven Solution | Both arrays must be Dell Symmetrix | Licensed |
| ORS (Open Replicator) | Storage Level | Supports 3rd party arrays | Either array must be Dell Symmetrix | Licensed, except hot pull |
| LVM (Logical Volume Manager) | OS level | Online migration | Complex | No license needed |
| RP (Recover Point) | Appliance based | Snap point in time based | Complex | Licensed |
| ••• | ••• | ••• | ••• | ••• |
| NDM (Non-Disruptive Migration) | Storage Level | Online migration | Supportability | Licensed |

FIG. 7B

| | Deciding Factors 710 | | | |
|---|---|---|---|---|
| Application Downtime | Storage/host based | Type of Source/Target storage array | Current configuration | Operating cost |
| Minimal | Storage Based | VMAX / PMAX | SRDF license is in place | Nil |
| ••• | ••• | ••• | ••• | ••• |
| Zero | Storage or host based | NetApp / PMAX | Nil | Nil |

FIG. 7C

| Module 1 Captured from Report | | Captured from user questionaire | | | | | | Weightage / Rank | | | | |
|---|---|---|---|---|---|---|---|---|---|---|---|---|
| Source Array | Target Array | Server Type | Host Based? | Storage Based? | SRDF License? | SRDF Exist? | Downtime permitted? | New DR setup? | RP? | SRDF | NDM | OR | LDM | RP |
| VMAX | VMAX | Win | No | Yes | Yes | Yes | Yes | Yes | No | 1 | 2 | 3 | NA | NA |
| | | | No | Yes | Yes | No | No | No | No | 2 | 1 | 3 | NA | NA |
| | | | No | Yes | No | No | Yes | No | No | NA | NA | 1 | NA | NA |
| PMAX | PMAX | | Yes | Yes | Yes | No | Yes | No | No | 2 | NA | NA | 1 | NA |

Weighted Data Migration Option Summary Report 715

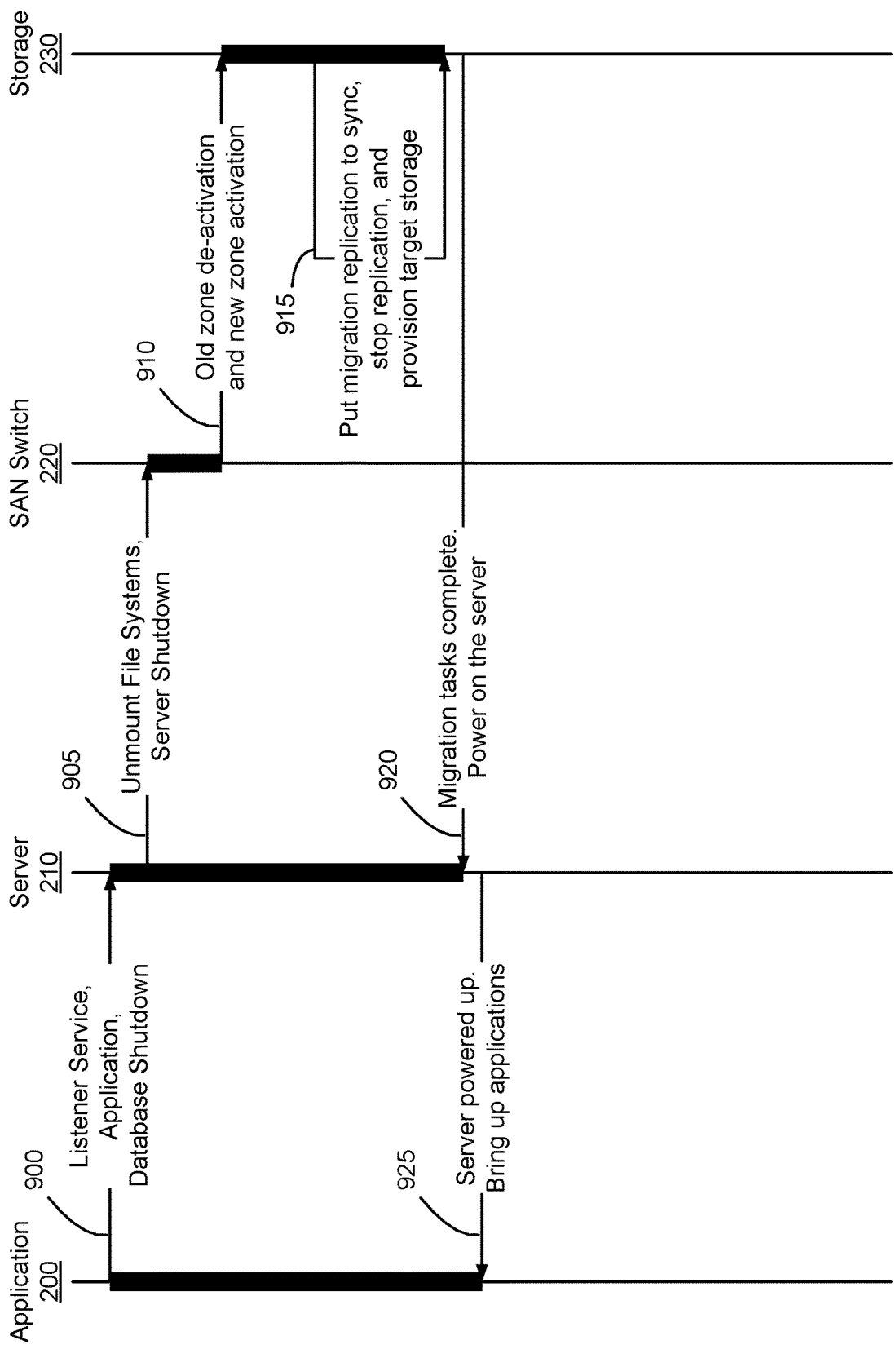

METHOD AND APPARATUS FOR PLANNING AND COORDINATING BLOCK DATA MIGRATION BETWEEN DISPARATE STORAGE SYSTEMS

FIELD

This disclosure relates to computing systems and related devices and methods, and, more particularly, to a method and apparatus for planning and coordinating block data migration between disparate storage systems.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a data migration orchestration system is provided containing a data migration orchestration engine, a user interface, and an orchestration configuration database. The user interface provides a menu-based system configured to guide a user through a process of implementing a data migration instance. The orchestration configuration database contains information about the types of data migration technologies available to be used to implement data migration operations between disparate storage systems.

The data migration orchestration engine has a storage environment capture module configured to capture parameters of the current storage environment and target storage environment. A storage environment analysis engine uses the captured parameters to validate the source and target configurations and recommend any remediation steps that should be implemented prior to implementing the proposed block data migration.

The storage environment analysis engine also generates and presents, via the user interface a set of ranked proposed data migration methods that may be selected for the block data migration. A block data migration preparation module prepares the target storage environment to receive the data for the block data migration, and generates all requisite commands to implement the block data migration according to the selected data migration method. A block data migration execution module manages execution of the block data migration operation, and automates rollback if the block data migration operation is not successful.

By providing a data migration orchestration system, it is possible to greatly simplify the process of block data migration and increase the likelihood of successfully implementing block data migrations between disparate storage arrays in a storage environment, thus increasing operating efficiencies of the manner in which the storage systems interact within a given storage environment.

BRIEF DESCRIPTION OF THE DRAWINGS

FIGS. 7A-7C are functional block diagrams of example data structures used by a storage environment analysis module of the data migration orchestration engine of FIG. 4 to rank available data migration solutions for a data migration operation, according to some embodiments.

FIG. 9 is a swim lane diagram showing actions by components of a storage environment during block data migration of a data volume from a first storage array to a second storage array, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
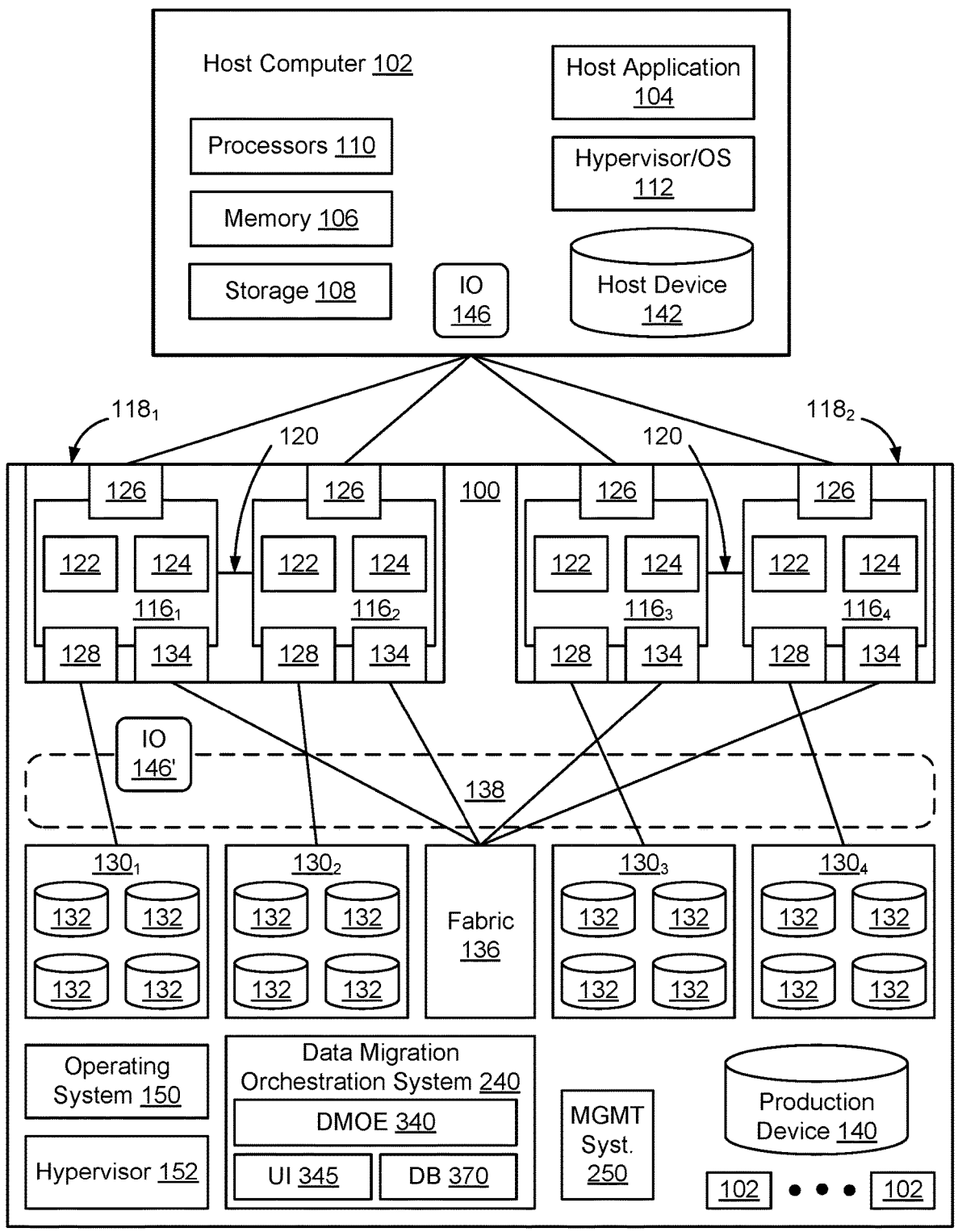
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

There may be multiple paths between the host computer 102 and the storage system 100, e.g. one path per front end adapter 126. The paths may be selected based on a wide variety of techniques and algorithms including, for context and without limitation, performance and load balancing. In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132. The virtual shared global memory 138 may enable the production device 140 to be reachable via all of the compute nodes $116_1$-$116_4$ and paths, although the storage system 100 can be configured to limit use of certain paths to certain production devices 140.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. The host computer 102 can then execute read/write IOs on the TDev to access the data of the production device 140.

There are times when data stored on one storage array needs to be transferred to reside on another storage array in the storage environment. Transferring data between storage arrays will be referred to herein as "block data migration."

Block data migration is a critical task that often requires a team of experts specialized in various aspects of the storage environment in which the block data migration will take place. For example, different storage array vendors may support different ways of transferring data, and the network components themselves such as the fabrics to which the storage arrays are connected may have limitations that can impact the particular method selected to implement a given block data migration. Further, different methods of transferring data can impact whether the data is continuously available during the block data migration process, which can impact application performance. Accordingly, preparing for a block data migration event, and selecting the right migration solution is a challenging and time-consuming process. For example, it is not uncommon for a team of experts with different skill sets to be required to implement a data migration event. For example, if a data volume is being moved from a first storage array that is running a UNIX operating system to a second storage array that is running a Windows-based operating system, and the different storage arrays are in differently configured storage area networks, it might be necessary to engage a first expert that specializes in operating systems, a second expert that specializes in storage area networks, and a data expert. Collectively the group of individuals will determine a plan to implement the data migration event, but even with a team of this nature it is possible for the data migration event to not be successful.

According to some embodiments, a data migration orchestration system is provided containing a data migration orchestration engine, a user interface, and an orchestration configuration database. The user interface provides a menu-based system configured to guide a user through a process of implementing a data migration instance. The data migration orchestration engine has a storage environment capture module configured to capture parameters of the current storage environment and target storage environment. A storage environment analysis engine uses the captured parameters to validate the source and target configurations and recommend any remediation steps that should be implemented prior to implementing the proposed block data migration.

The storage environment analysis engine also generates and presents, via the user interface a set of ranked proposed data migration methods that may be selected for the block data migration. A block data migration preparation module prepares the target storage environment to receive the data for the block data migration, and generates all requisite commands to implement the block data migration according to the selected data migration method. A block data migration execution module manages execution of the block data migration operation, and automates rollback if the block data migration operation is not successful.

By providing a data migration orchestration system, it is possible to greatly simplify the process of block data migration and increase the likelihood of successfully implementing block data migrations between disparate storage arrays in a storage environment, thus increasing operating efficiencies of the manner in which the storage systems interact within a given storage environment.

Figure 2:
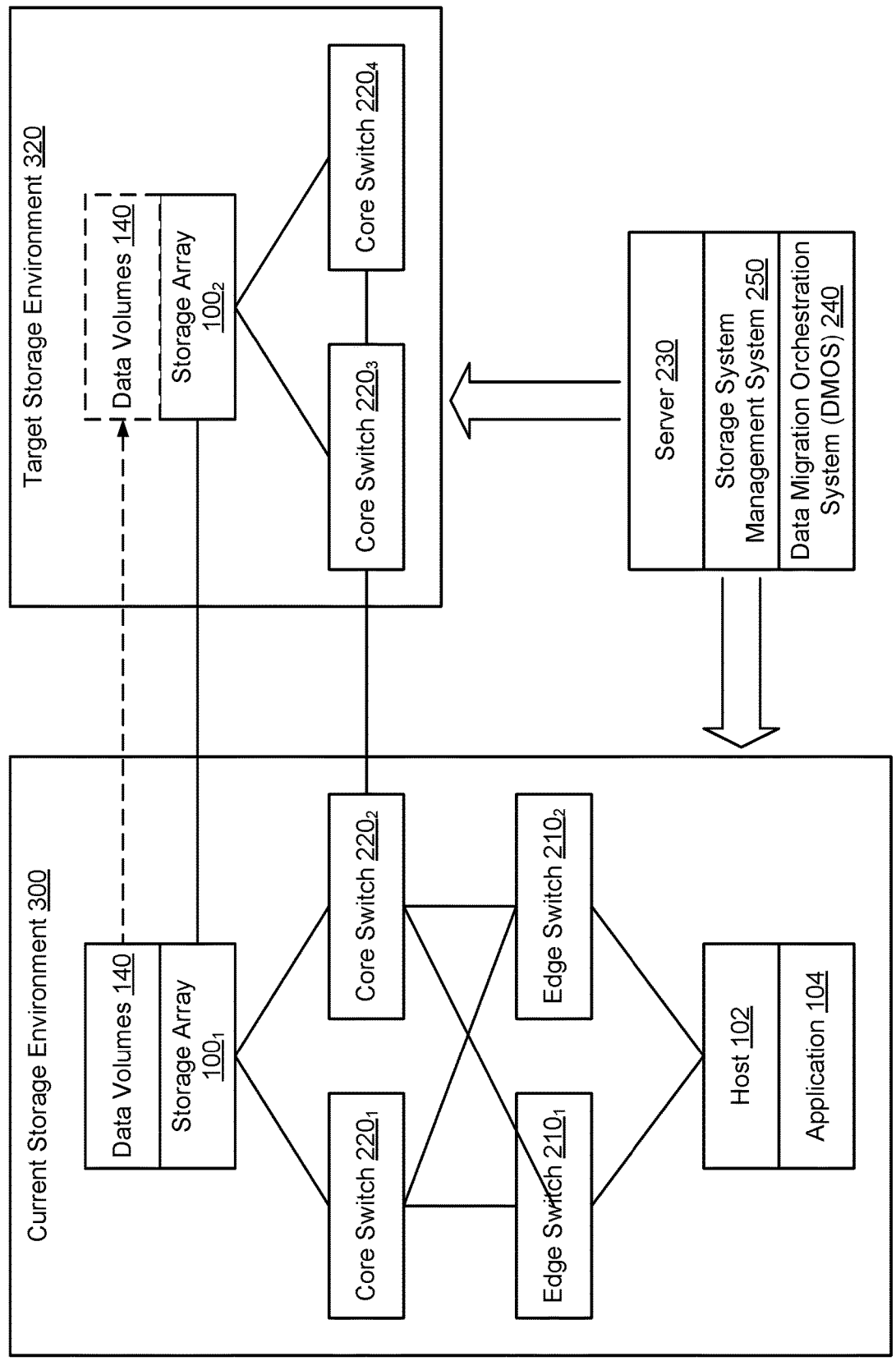
FIG. 2 is a functional block diagram of an example storage environment showing block data migration of a set of data volumes from a first storage array to a second storage array, according to some embodiments.

FIG. 2 is a functional block diagram of an example storage environment showing block data migration of a set of data volumes from a first storage array to a second storage array, according to some embodiments. As shown in FIG. 2, in some embodiments an application 104 on host 102 accesses one or more data volumes 140 on a first storage array $100_1$. For various reasons, a decision has been made that the set of data volumes 140 should be migrated from storage array $100_1$ to storage array $100_2$. A Fiber Channel/Internet Protocol (FC/IP) network, or other type of network, may be used to interconnect storage array $100_1$ and storage array $100_2$ to facilitate the block data migration of the data volumes 140.

As shown in FIG. 2, in some embodiments a data migration orchestration system 240 is included on a server 230 connected to the source and target storage environments, e.g. via a VC/IP network. The data migration orchestration system 240 might run separately or, in some embodiments, is run in connection with a storage system management system 250 configured to control one or more of the storage arrays $100_1$, $100_2$.

Figure 3:
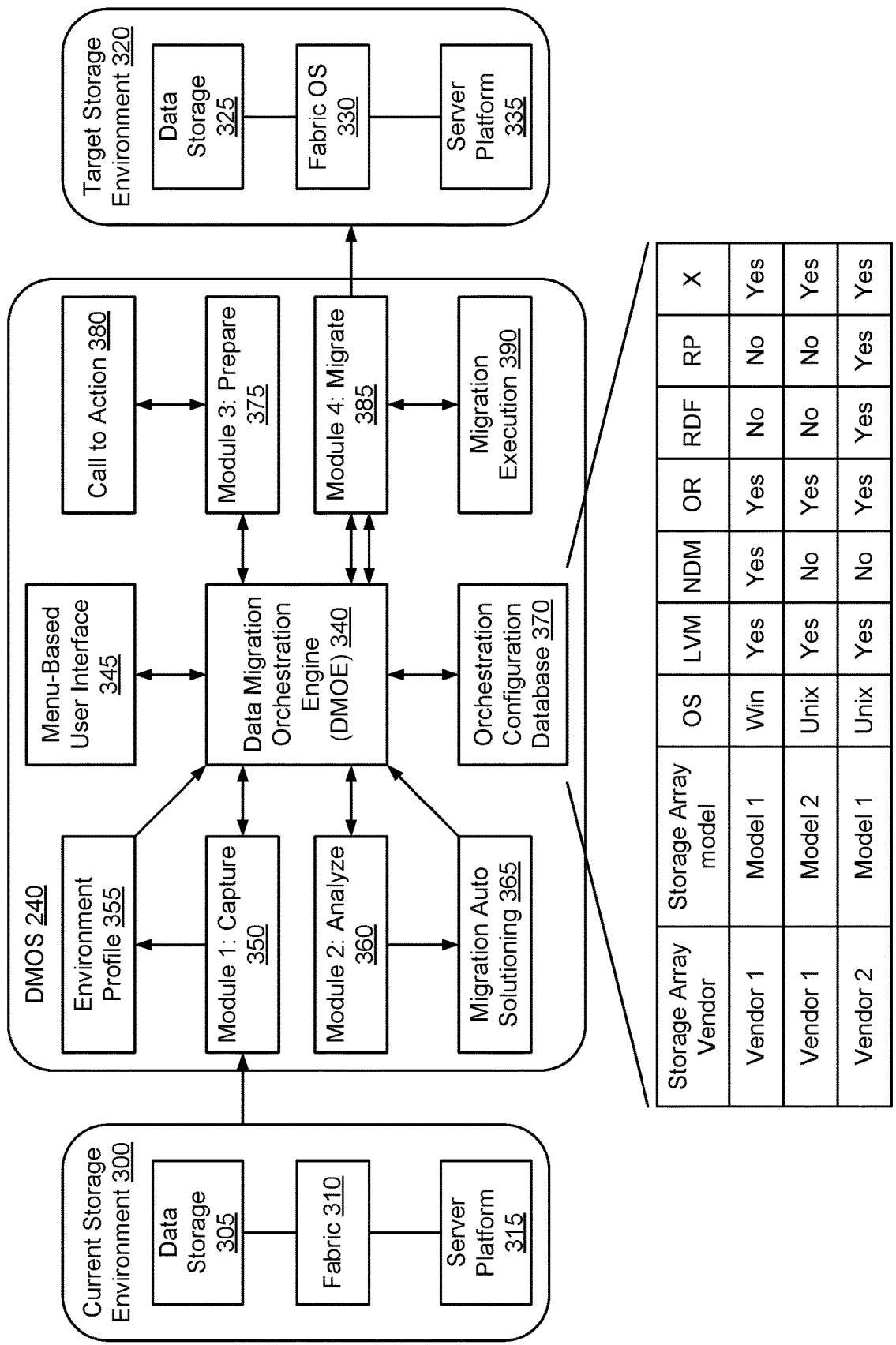
FIG. 3 is a functional block diagram of an example data migration orchestration system configured to coordinate block data migration between disparate storage systems, according to some embodiments.

FIG. 3 is a functional block diagram of an example Data Migration Orchestration System (DMOS) 240 configured to coordinate block data migration between disparate storage systems, according to some embodiments. As shown in FIG. 3, in some embodiments the data migration orchestration system 240 has a data migration orchestration engine 340, a menu-based user interface 345, and an orchestration configuration database 370. The orchestration configuration database 370, in some embodiments, contains information about the types of data migration technologies available to be used to implement data migration operations between disparate storage systems.

The data migration orchestration engine, in some embodiments, has four modules: a storage environment capture module 350, a storage environment analysis module 360, a block data migration preparation module 375, and a block data migration execution module 385.

In some embodiments, the storage environment capture module 350 is configured to capture storage environment information about a current storage environment 300 and target storage environment 320. Example information that is captured by the storage environment capture module 350 includes information about the data storage 305, fabric 310, and server platform 315 of the current storage environment 300, and information about the data storage 325, fabric 330, and server platform 335 of the target storage environment 320. Based on this captured information, the storage environment capture module 350 generates an environment profile 355.

The storage environment analysis module 360 is configured to analyze the environment profile 355 to generate a migration auto solutioning plan 365, based on the types of data migration technologies available for use with the disparate storage system, as specified in the orchestration configuration database. The block data migration preparation module 375 uses the migration auto solutioning plan 365 to generate a call to action 380, which contains a set of steps to be implemented to execute the block data migration. The block data migration execution module 385 is configured to execute the block data migration 390, and monitor the block data migration during the actual transition from the first storage array $100_1$ to the second storage array $100_2$, and implement automatic rollback if the data migration operation is not successful. Each of these modules is explained in greater detail below.

In some embodiments, the user interface is a menu-based user interface configured to receive input from the user regarding an intended block data migration, and to present subsequent menus to the user to collect any required information required for implementation of the block data migration. The user interface 345 also is used to present the user with a ranked selection of available technological methods of implementing the block data migration, together with advantages/disadvantages of each method, to enable the user to be allowed to select a desired technological method for implementing the block data migration. By ensuring that all the requisite information is collected, and presenting only the available set of methods that may be used to implement the intended block data migration, it is possible to guide a relatively inexperienced user through the process of implementing a block data migration while ensuring that the block data migration occurs within the storage environment, even between disparate storage arrays. In some embodiments, the data migration orchestration engine is written in Python and is configured to interact with native storage management software 250.

Figure 4:
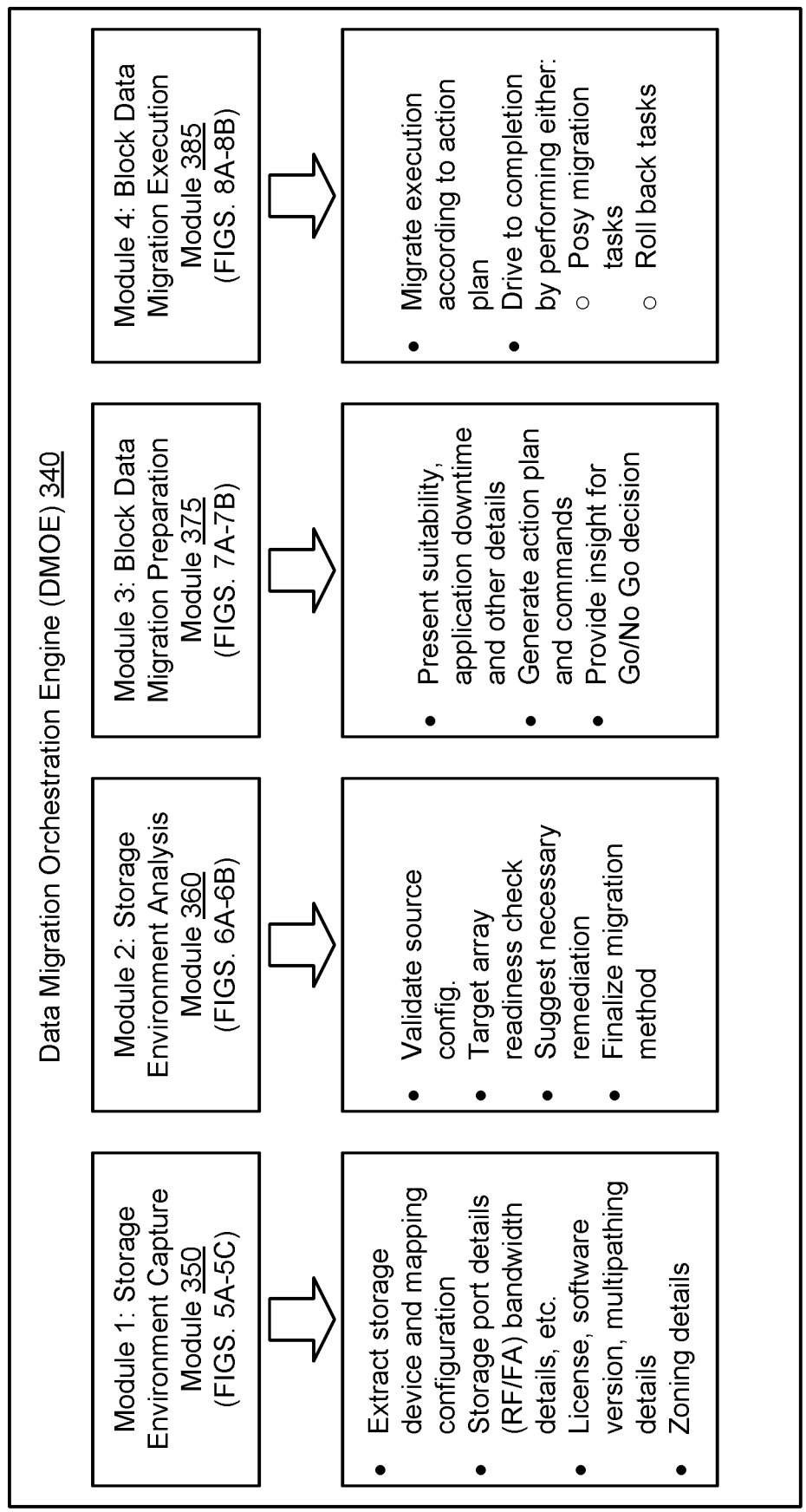
FIG. 4 is a functional block diagram of an example data migration orchestration engine of the data migration orchestration system of FIG. 3, according to some embodiments.

FIG. 4 is a functional block diagram of an example data migration orchestration engine of the data migration orchestration system of FIG. 3, according to some embodiments. As shown in FIG. 4, in some embodiments the Data Migration Orchestration Engine (DMOE) 340 includes a storage environment capture module 350, an example of which is described in greater detail in connection with FIGS. 5A-5C. Example functions performed by the storage environment capture module include extracting the storage device and mapping configuration from the current storage array 305, obtaining the storage port details such as the available bandwidth on the front-end adapter on the storage array and on the fabric, obtaining information about which types of data migration technologies are licensed to be used to implement the data migration operation, and obtaining information about any zoning restrictions within the current storage environment 300. Similar details may be collected about the target storage environment.

The data migration orchestration engine 340 also includes a storage environment analysis engine 360, an example of which is described in greater detail in connection with FIGS. 6A-6B. Example functions performed by the storage environment analysis engine 360 include validating the source configuration, performing a readiness check on the target storage array, suggesting any necessary remediation operations required in the current storage environment and target storage environment, and finalizing selection of the migration method. For example, the source or target storage array might be running an out-of-date operating system which should be patched before implementing the block migration. Likewise, best practices might indicate that the data volume 140 should be protected by having point-in-time copies periodically generated. The storage environment analysis engine, in some embodiments, suggests any necessary remediations and best practices to enable any required updates to be identified via the user interface in connection with planning of the block data migration.

In some embodiments, the storage environment analysis engine 360 is configured to present the user with a ranked set of technical options that may be used to implement the data migration operation. The ranked set of technical data migration solutions present the user with information about the suitability of the technical data migration option, the amount of application downtime associated with selecting each of the particular data migration techniques, and providing the user with insight required to enable the user to make a go/no go decision for the data migration The data migration orchestration engine 340 also includes a block data migration preparation module 375. In some embodiments, example functions performed by the block data migration preparation module include generating an action plan for data migration and generating all required commands that will be required to implement the data migration operation. The block data migration preparation module 375 also prepares the target storage environment, and provides the user with information to enable the user to make a go/no go decision to enable the user to initiate the data migration operation.

The data migration orchestration engine 340 also includes a block data migration execution module 385. Once the user selects a particular data migration solution and instructs, via the user interface 345, that the data migration should occur, the block data migration execution module 385 implements the data migration according to an action plan developed for the block data migration. The block data migration execution module 385 drives the data migration to completion, and then automatically implements all post migration tasks (where the data migration is successful) or automatically implements all required roll-back tasks (where the data migration is unsuccessful).

Figure 5A:
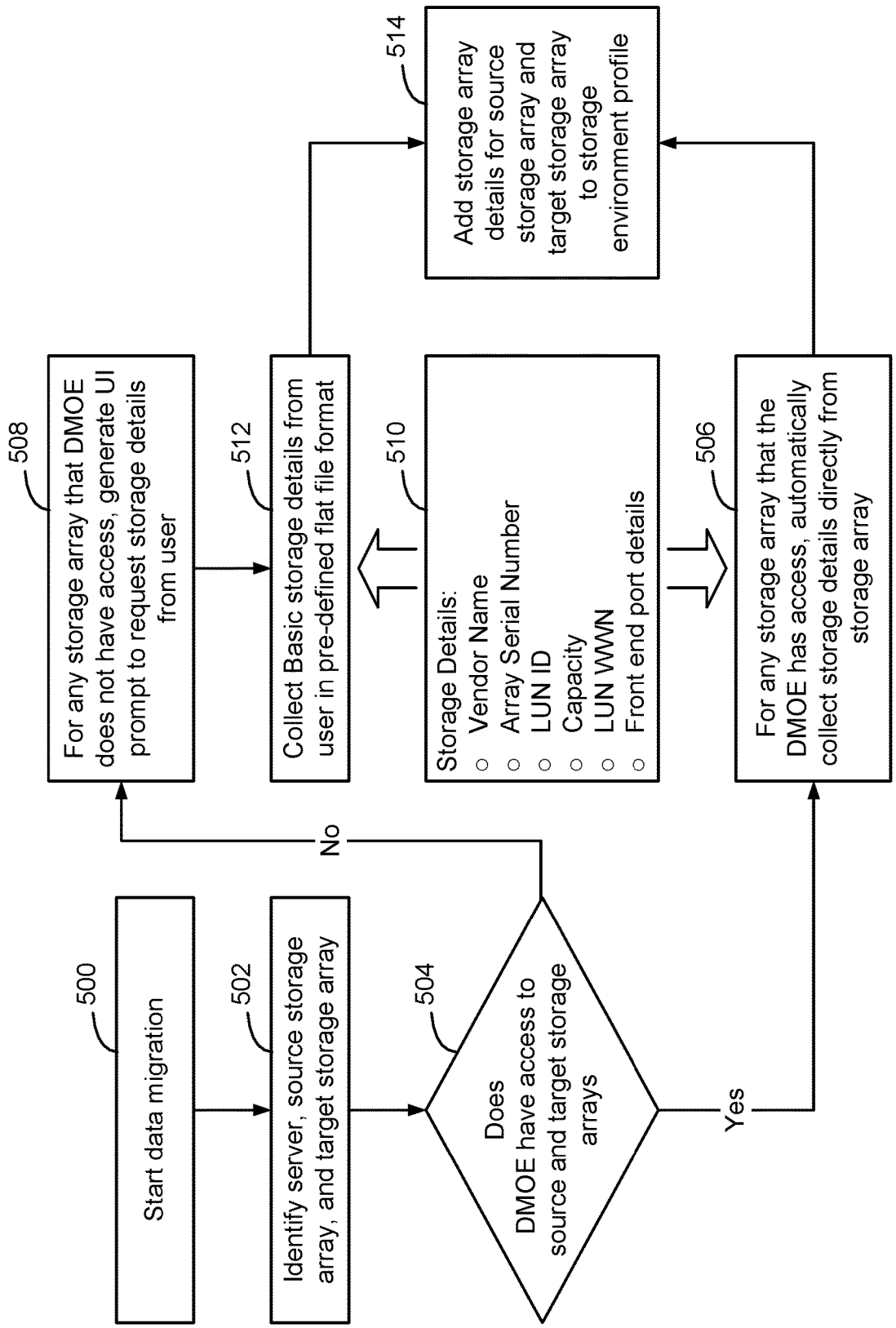
FIGS. 5A-5C are a flow chart of a process implemented by a storage environment capture module of the data migration orchestration engine of FIG. 4, according to some embodiments.
Figure 5B:
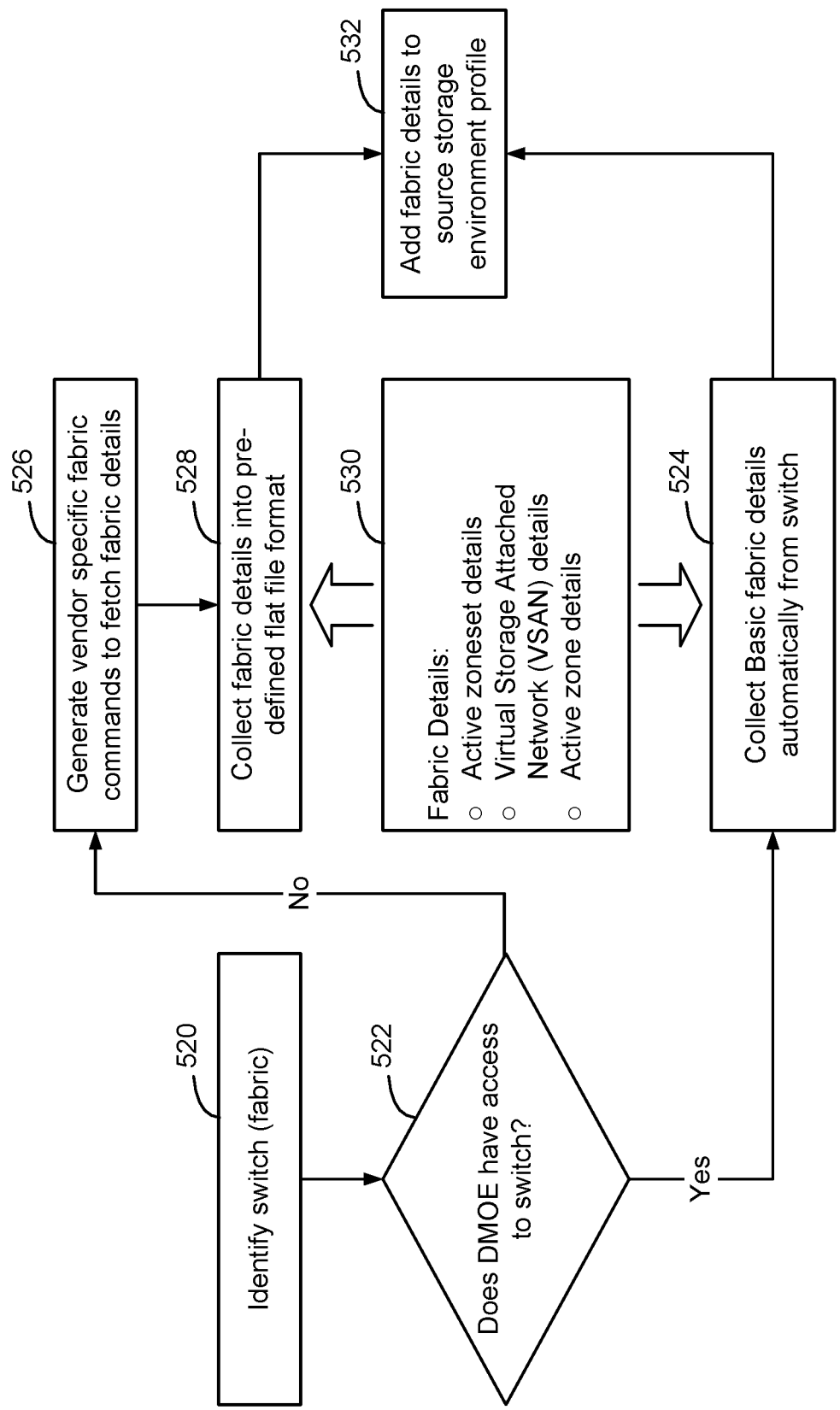
Figure 5C:
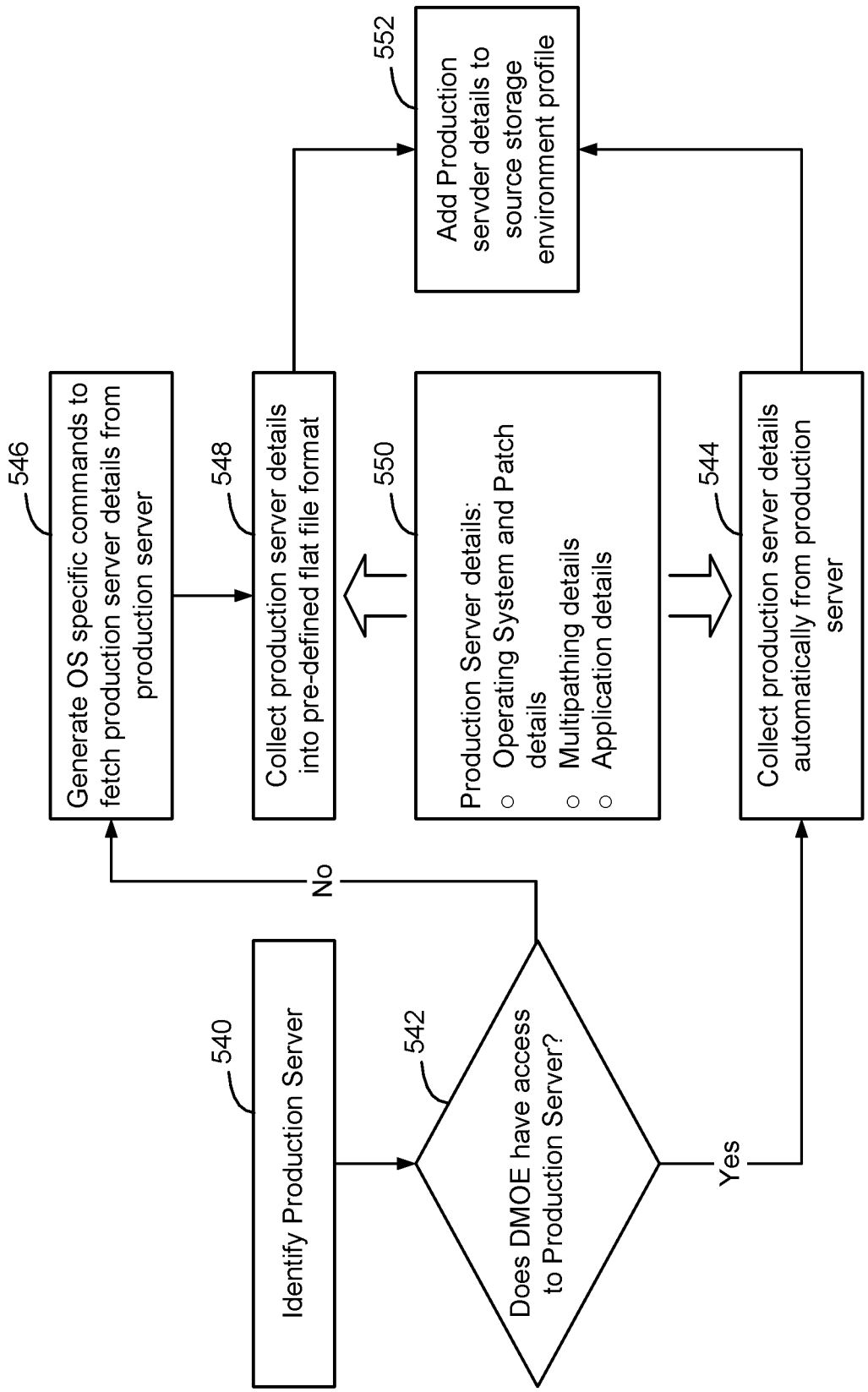

FIGS. 5A-5C are a flow chart of a process implemented by a storage environment capture module 350 of the data migration orchestration engine 340 of FIG. 4, according to some embodiments. As shown in FIG. 5A, when an instruction is received to initiate a data migration operation (block 500) the storage environment capture module 350 will identify the server, source storage array, and target storage array involved in the block data migration (block 502). In some embodiments, the parameters collected by the storage environment capture module 350 in block 502 are input by the user via the user interface 345 when the user identifies the data migration operation.

The storage environment capture module 350 then determines whether the data migration orchestration engine 340 has access to the source and target storage arrays. For example, the data migration orchestration engine 340 might have access to all storage arrays made by a particular vender, but not have access to storage arrays not made by that vendor. For example, if the storage system management system 330 is configured to manage Dell™ storage arrays, and the data migration orchestration engine 340 is tightly coupled with the storage system management system 330, the data migration orchestration engine 340 might have access to the configuration information associated with all Dell storage arrays but not have access to configuration information associated with IBM™ storage arrays.

Accordingly, in block 504, the storage environment capture module 350 determines if the data migration orchestration engine 340 has access to both the source and target storage arrays. For any storage array that the data migration orchestration engine 340 has access (a determination of YES at block 504) the storage environment capture module 350 will automatically collect storage details directly from the storage array (block 506). For any storage array that the data migration orchestration engine 340 does not have access (a determination of NO at block 504) the storage environment capture module 350 will generate a user interface 345 prompt, e.g. in the form of a template (block 508), to provide a structured way to collect all required information about the source and target storage arrays required to implement the data migration (block 512). Example storage array details might include the storage array vendor name, storage array serial number, storage volume Logical Unit Number (LUN) identifier (ID), the capacity of the data volume that is to be migrated, the LUN World-Wide Identifier LUN WWN), front-end port details, etc. (block 510). The storage array details are added, by the storage environment capture module 350, to a storage environment profile 355 which may be implemented, for example, using a flat file format (block 514).

The storage environment capture module 350 also obtains information about the switch (fabric) to which the source storage array is connected (see FIG. 5B). As shown in FIG. 5B, in some embodiments the storage environment capture module 350 identifies the switch 310 in the current storage environment (block 520) and determines whether the data migration orchestration engine 340 has access to the switch 310 (block 522). If the data migration orchestration engine 340 has access to the switch (a determination of YES at block 522), the storage environment capture module 350 collects basic fabric details automatically from the switch (block 524). If the data migration orchestration engine 340 does not have access to the switch (a determination of NO at block 522), the storage environment capture module 350 generates vendor specific fabric commands to collect the required fabric details from the switch (block 526), and collects the fabric details into a pre-defined flat file format (block 528). Example fabric details might include active zoneset details, virtual storage attached network (VSAN) details, and active zone details (block 530), although other details might be collected as well. All fabric details are added to the source storage environment profile.

The storage environment capture module 350 also obtains information about the production server hosting the application that is using the data volume that is to be transferred in connection with the data migration operation (see FIG. 5C). As shown in FIG. 5C, in some embodiments the storage environment capture module 350 identifies the production server (block 540) and determines whether the data migration orchestration engine 340 has access to the production server (block 542). If the data migration orchestration engine 340 has access to the production server (a determination of YES at block 542), the storage environment capture module 350 collects production server details automatically from the production server (block 544). If the data migration orchestration engine 340 does not have access to the production server (a determination of NO at block 542), the storage environment capture module 350 generates OS specific commands to retrieve production server details from the production server (block 546), and collects the production server details into a pre-defined flat file format (block 548). Example production server details might include the operating system and patch details of the production server, any multipathing details, and Logical Unit Number (LUN) grouping details created based on the application's requirements (block 550). All production server details are added to the source storage environment profile.

FIGS. 5A-5C show separate collection processes implemented by the storage environment capture module 350. These collection processes may be implemented serially or, alternatively, may be implemented at the same time depending on the implementation. Likewise, the process shown in FIGS. 5A-5C can be implemented in any desired order, depending on the implementation.

Figure 6A:
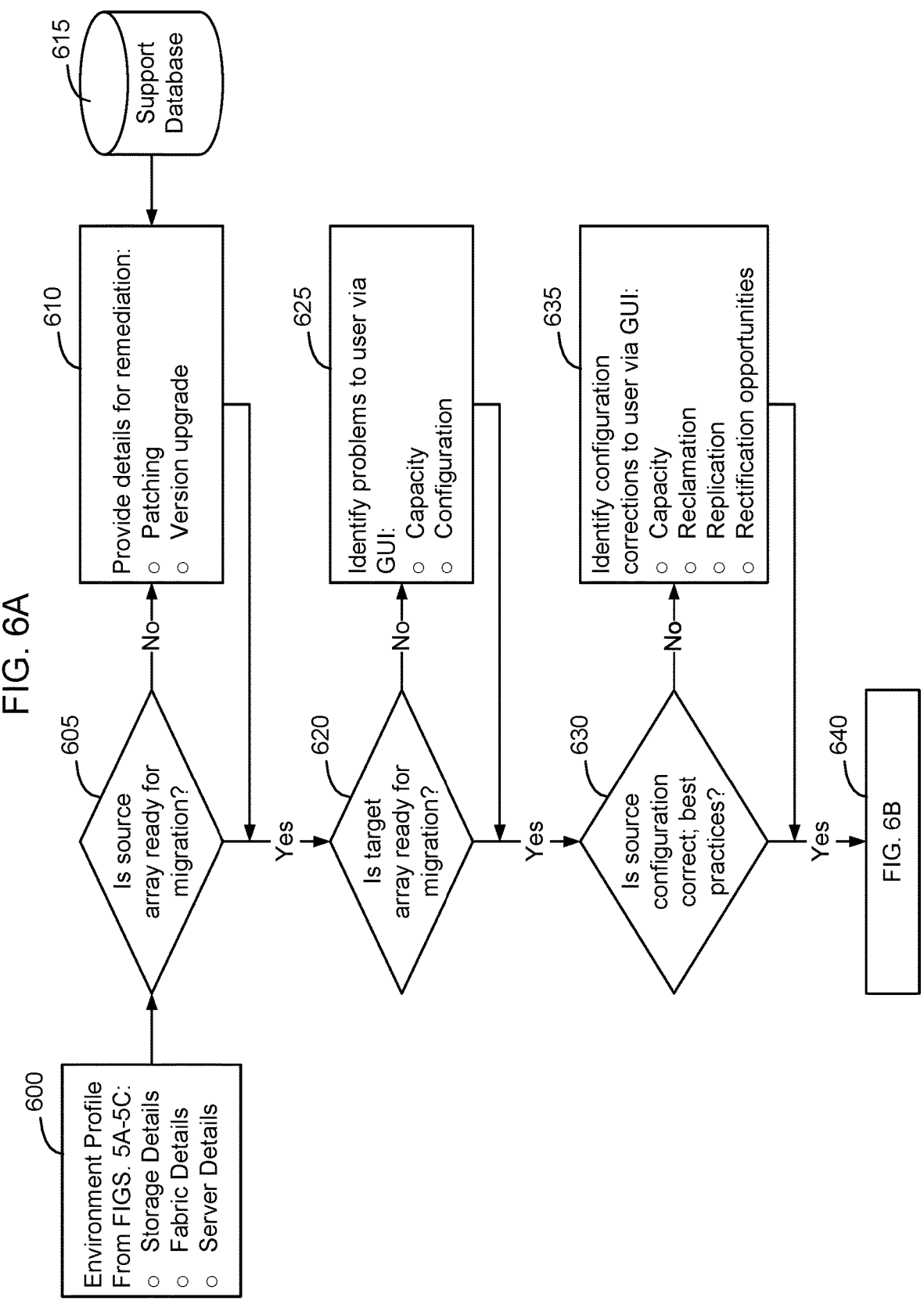
FIGS. 6A-6B are a flow chart of a process implemented by a storage environment analyze module of the data migration orchestration engine of FIG. 4, according to some embodiments.
Figure 6B:
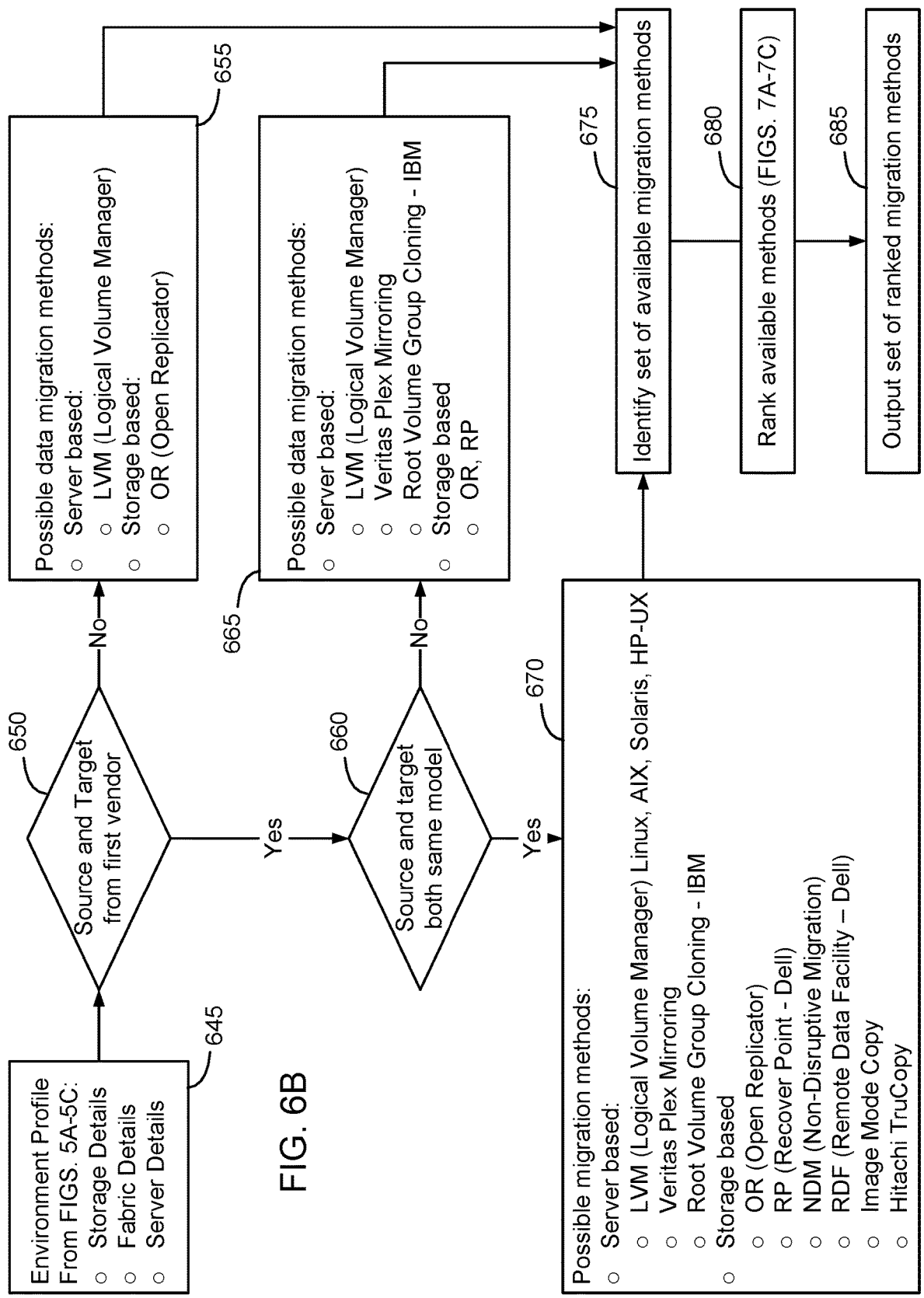

FIGS. 6A-6B are a flow chart of a process implemented by a storage environment analysis module 360 of the data migration orchestration engine 340 of FIG. 4, according to some embodiments. As shown in FIG. 6A, in some embodiments the storage environment profile 355 generated by the storage environment capture module (see FIGS. 5A-5C) is passed to the storage environment analysis module 360 (block 600). The storage environment profile 355 includes the storage details from FIG. 5A, the fabric details obtained using the process shown in FIG. 5B, and the server details obtained using the process shown in FIG. 5C.

The storage environment analysis module uses the environment profile 355 to determine if the current source array is ready to perform the data migration (block 605). Example checks implemented on the source array include determining whether there are any patches or software upgrades that should be implemented on the source array, given the information about the source array and information about preferred storage array configuration profiles obtained from a support database 615. If the source array is not ready for data migration (a determination of NO at block 605) the storage environment analysis module 360 provides details for remediation of the source array, including information such as patches that should be applied to the source array and any software version upgrades that should be implemented on the source array prior to data migration (block 610). In some embodiments, the remediation details are used to generate a report which is presented to the user via the user interface. If the required patches/software/configuration remediations are available, and the user is willing to implement the remediation, the data migration orchestration engine generates the requisite commands to implement the suggested remediation operations on the source storage array. If the source array is ready for data migration (a determination of YES at block 605) or once remedial action has been taken to place the source array in a ready state for data migration, the source array is determined to be ready for data migration.

The storage environment analysis module 360 also uses the environment profile 355 to determine if the target storage array is ready to perform the data migration (block 620). If the target storage array is not ready to perform the data migration (a determination of NO at block 620) the storage environment analysis module 360 generates a report identifying the problems with the target storage array, which is presented to the user via the GUI 345 (block 625). Example problems that might be identified on the target storage array include a lack of capacity on the target storage array to handle the proposed data migration, a mis-configuration or other hardware issue on the target storage array that would prevent the target storage array from hosting the data volume associated with the data migration, etc.

The storage environment analysis module 360, in some embodiments, also evaluates the environment profile 355 to determine if the source configuration is correct, and if it complies with best practices (block 630). The source data volume might be implemented without point-in-time backups configured, whereas it might be desirable to implement this type of best practice once the data migration has been implemented. Rather than simply implementing the data migration and replicating the current non-optimal configuration, in some embodiments the storage environment analysis module 360 determines whether the source configuration is correct and whether best practices are implemented in the source configuration (block 630). If the storage environment analysis module determines 360 that the current configuration is not correct, or that one or more best practices are not implemented in the source configuration (a determination of NO at block 630) the storage environment analysis module 360 identifies proposed configuration corrections to the user via the GUI 345. Example configuration correction include increasing capacity for the data volume on the target storage array, implementing reclamation on the storage volume, establishing replication for the target volume, or implementing any other rectification opportunities. The user is then presented, via the GUI, with the opportunity to rectify any configuration corrections or implement any suggested best practices in connection with implementation of the data migration.

Although FIG. 6A shows the storage environment analysis module 360 implementing blocks 605, 620, and 630 serially, it should be understood that the storage environment analysis module 360 may implement these processes in a different order or may implement these processes simultaneously, depending on the implementation.

In addition to evaluating the aspects shown in FIG. 6A, in some embodiments the storage environment analysis module 360 also evaluates the type of data migration technology that might be used to implement the data migration operation, as shown in FIG. 6B. Specifically, different types of storage arrays might support different types of data migration technologies, and a storage array might need a license to use a particular type of data migration technology. In some embodiments, as shown in FIG. 3, the data migration orchestration system 200 includes an orchestration configuration database 370 that identifies each storage array vendor, storage array model, the type of operating system in use on the storage array, and the type of data migration technology supported by that vendor/model/OS. Example data migration technologies might include:

Server-Based:
LVM (Logical Volume Manager)—a Linux/AIX/HP-UX/Solaris data migration technology
Veritas Plex Mirroring—a Veritas/Symantec data mirroring technology
Root Volume Group Cloning—a IBM Operating System Root Disk Mirroring technology
Storage-Based:
RDF (Remote Data Facility)—a Dell data migration technology
TruCopy—a Hitachi data migration technology
OR (Open Replication)—a Dell data migration technology
Image Mode Copy—a IBM data migration technology
NDM (Non-Disruptive Migration)—a Dell data migration technology
RP (Recover Point)—a Dell data migration technology The particular types of data migration technologies that might be used, in some embodiments, depend on whether both the source and target storage arrays are made by the same vendor. If the storage environment analysis module 360 determines that the source and target storage arrays are not made by the same vendor (a determination of NO at block 650), in some embodiments the possible migration methods might include one or more server-based data migration technologies, such as LVM, which is a Linux based data migration technology (block 655). Likewise, it might be possible to use a storage based data migration technology, such as OR, where both storage arrays support that type of data replication.

If both the source and vendor are from the first vendor (a determination of YES at block 650), it is possible that the vendor will incorporate support for one or more additional data replication technologies. However, some vendors only support particular data replication technologies in connection with particular models. In the example shown in FIG. 6B, an assumption has been made that if the source and target storage arrays are from the same vendor but are not of the same model (a determination of NO at block 660), then the possible data migration methods include server based LVM, Veritas Plex Mirroring, and Root Volume Group Cloning, and storage based OR and RP (block 665). Likewise, in the example shown in FIG. 6B, an assumption has been made that if the source and target storage arrays are from the same vendor and are the same model (a determination of YES at block 660), then the possible data migration methods include server based LVM, Veritas Plex Mirroring, and Root Volume Group Cloning, and storage-based data replication technologies OR, RP, NDM, RDF, Image Mode Copy, and Hitachi TruCopy (block 670).

It should be understood that the example shown in FIG. 6B is merely one example. In some embodiments, the storage environment analysis module 360 determines the source array vendor, model, and operating system from the storage environment profile 355, and determines the target storage array vendor, model, and operating system from the storage environment profile 355. The storage environment analysis module 360 then uses this information to determine from the orchestration configuration database 370 which types of data replication technologies are supported by both the source and target storage arrays. Any data replication technology that is supported by both the source array and target storage array is a candidate data replication technology that might be used to implement the data migration operation (block 675).

FIGS. 7A-7C are functional block diagrams of example data structures used by a storage environment analysis module of the data migration orchestration engine of FIG. 4 to rank available data migration solutions for a data migration operation (block 680), according to some embodiments.

FIG. 7A shows an example migration method profiling database 700 which includes information about each available data migration method. As new data migration methods are created, or encountered, the migration method profiling database 700 can be updated to list the attributes of the new data migration method. In some embodiments, the example data migration technology attributes include information about whether the data migration technology is server based or storage based. Server based data migration technologies rely on the application server 315 to perform the data migration operation. Thus, in a server-based data migration technology, the server would execute read operations on the storage volume to cause the data to be retrieved from the storage array, and then issue write operations on the target storage array to cause the data to be transmitted to the target storage array. A server-based data migration technology, by contrast, relies on background processes in the storage arrays to enable the storage arrays to directly transfer the data volumes in connection with a data migration operation. There are also appliance-based data migration technologies, which rely on a specialized appliance on the network to implement the data migration operation.

In some embodiments, the migration method profiling database 700 also includes information about the benefits of each particular data migration technology, the limitations of the data migration technology, and the cost of the data migration technology. The benefits, limitations, and cost can be presented to the user when the storage environment analysis module outputs a set of ranked migration methods (block 685) to help the user select a preferred data migration technology to be used to implement the data migration operation.

In some embodiments, the storage environment analysis module 360 maintains a deciding factors data structure 710, an example of which is shown in FIG. 7B. As shown in FIG. 7B, the deciding factors data structure 710 contains a series of entries that may be used by the storage environment analysis module 360 to rank possible data migration technologies for a particular data migration operation. The storage environment analysis module analyzes the deciding factors from the data structure shown in FIG. 7B against the migration method profiling database to calculate a weighted value/ranking for every available data migration technology. In some embodiments, the data migration technology that is selected is based on the highest weightage/ranking.

FIG. 7C shows an example weighted data migration option summary report 715 that is output at block 685. In the example report shown in FIG. 7C, it is assumed that the storage environment capture module determined that the source array for the hypothetical data migration is a VMAX array from Dell, the target storage array for the example data migration is also a VMAX array, and that the server is running a Windows operating system. Based on answers from a user questionnaire, which can affect the weighting of the deciding factors, the storage environment analysis module 360 has identified RDF as the preferred data migration technology, NDM as the second preferred data migration technology, and OR as the third ranked data migration technology. When presented with this selection, the user is able to select any of the available data migration technologies via the user interface to cause the selected data migration technology to be used in connection with the data migration operation.

Figure 8:
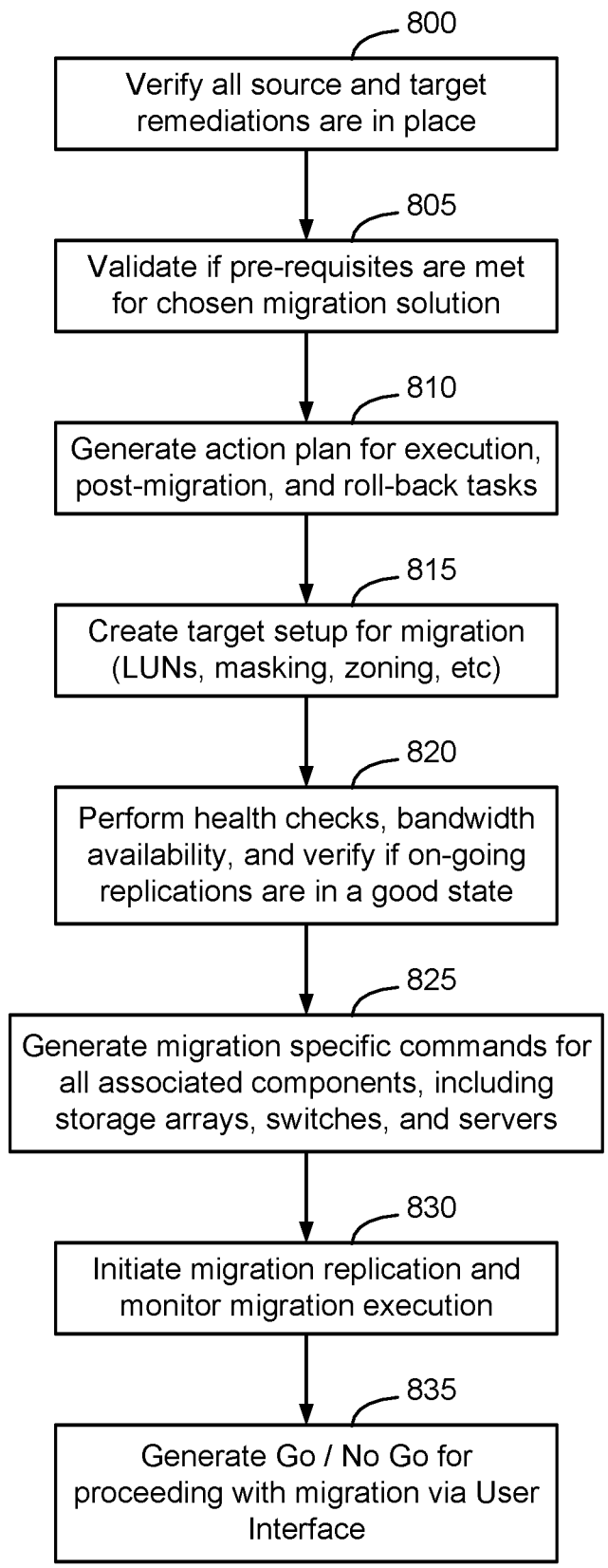
FIG. 8 is a flow chart of an example process implemented by a block data migration preparation module of the data migration orchestration engine, according to some embodiments.

FIG. 8 is a flow chart of an example process implemented by a block data migration preparation module 375 of the data migration orchestration engine 340, according to some embodiments. As shown in FIG. 8, once a decision has been made to initiate a data migration operation using a selected data migration technology, the data migration orchestration engine 340 uses a block data migration preparation module to configure all the requisite constructs on the target storage array and otherwise prepares the storage environment for implementation of the data migration operation.

For example, in some embodiments the block data migration preparation module 375 verifies that all source and target remediations are in place (block 800). The block data migration preparation module 375 also validates if all the pre-requisites have been met for a chosen migration plan (block 805). If either of these contexts is not met, in some embodiments the user is presented with instructions via the user interface as to what actions are suggested, or need to be implemented, prior to execution of the data migration operation.

The block data migration preparation module 375 also generates an action plan for execution of the data migration operation, a plan of what actions will need to be taken once the data migration operation has successfully executed, and a set of tasks that would need to be taken (roll-back tasks) if the data migration operations is not able to be successfully executed (block 810).

The block data migration preparation module 375 also configures the necessary constructs on the target storage array (block 815). For example, if a LUN is replicated, that information is analyzed for setting up replication in the new target storage array. Accordingly, the block data migration preparation module 375 will create any required LUNs on the target storage array, establish masking for the LUNs, create zoning on the target storage array, and otherwise configure the storage environment on the target storage array to enable the target storage array to host the data associated with the data migration operation.

The block data migration preparation module 375 also performs health checks, determines bandwidth availability (e.g. on the fabrics), and verifies if any on-going replications are in a good state (block 820) to verify that the components are currently able to participate in the data migration operation. The block data migration preparation module 375 generates migration specific commands for all associated components, including the storage arrays, switches, and servers (block 825). At this point, the commands are not sent to any of the components, but rather are created in advance so that the data migration operation is ready to proceed at a later point in time.

In some data migration operations, data replication will occur prior to execution of the data migration operation. For example, if the data migration operation is to be implemented using Remote Data Facility, which is a storage array mirroring technology, it is possible to set up an RDF mirroring pair such that a mirrored copy of the data volume is created on the target storage array. Accordingly, in some embodiments the block data migration preparation module 375 initiates migration replication and monitors the migration replication to ensure that a mirror copy of the data volume is properly created on the target storage array prior to implementation of the data migration operation (block 830).

Once everything is in place, and all systems are ready to proceed with the data migration operation, the block data migration preparation module 375 presents the user with a Go/No Go option via the user interface 345 (block 835). If the user elects to not Go with the data migration operation, the process ends. Subsequently, the user may elect to re-initiate the data migration operation.

If the user elects to Go with the data migration operation, the data migration orchestration engine 340 initiates the migration using the block data migration execution module 385. In some embodiments, the block data migration execution module 385 issues the migration specific commands created in block 825 to the network components involved in the data migration operation, and drives the data migration operation to completion. The block data migration execution module 385 also monitors execution of the data migration operation and, if the data migration operation is unsuccessful, the block data migration execution module 385 issues the roll-back commands generated in block 825 to execute the roll-back action plan developed in block 810 to enable the data volume to continue being available on the original storage array.

FIG. 9 is a swim lane diagram showing actions by components of a storage environment during block data migration of a data volume from a first storage array to a second storage array, according to some embodiments. As shown in FIG. 9, in an example data migration operation, a listener service receives an instruction to shut down the application and the database that is to be migrated during the data migration operation (arrow 900). The server unmounts the file systems and implements a server shutdown (arrow 905). The storage area network switch deactivates any old zoning and activates the new zoning (arrow 910). The storage array sets migration replication to synchronize, stops replication, and provisions the target storage (arrow 915). The storage array then notifies the server that the migration tasks are complete and the server is powered back on (arrow 920). Once the server is powered up, the applications can be restarted on the server (arrow 925) and the data migration operation is complete. The wide vertical black bars in FIG. 9 illustrate the period of time when the components are unavailable or are shut down. Although FIG. 9 shows the data migration occurring to the same server 210, the data migration can also cause the applications to be brought back up on a new server 210 depending on the intended data migration operation.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for planning and coordinating block data migration between disparate storage systems, the computer program including a set of instructions which, when executed by a computer, cause the computer to perform a method comprising the steps of:

receiving an instruction, on a user interface of a data migration orchestration system, to initiate a data migration operation of a storage volume from a current storage array to a target storage array, the data migration orchestration having a data migration orchestration engine;

capturing storage environment information by a storage environment capture module of the data migration orchestration engine, the storage environment information including information about components to be utilized in connection with the data migration operation, the components including the current storage array, the target storage array, a production server associated with the storage volume, and a switch connecting the production server to the current storage array;

analyzing the captured storage environment information to validate a source configuration of the storage volume, a target configuration of the target storage array, and to create a ranked list of data migration technologies that can be used to implement the data migration operation;

preparing instructions to the current storage array, the target storage array, the production server associated with the storage volume, and the switch by a block data migration preparation module of the data migration orchestration engine; and executing the block data migration operation by a block data migration execution module of the data migration orchestration engine by issuing the prepared instructions to the current storage array, the target storage array, the production server associated with the storage volume, and the fabric;

wherein capturing storage environment information comprises determining if the data migration orchestration engine has access to one or more of the components;

when the data migration orchestration engine has access to the one or more of the components, automatically collectin storage details directly from the one or more of the components; and when the data migration orchestration engine does not have access to the one or more of the components, generating user interface prompts to request manual input of storage details of the one or more of the components.

2. The non-transitory tangible computer readable storage medium of claim 1, wherein capturing storage environment information of the current storage array comprises determining if the data migration orchestration engine has access to the current storage array;

when the data migration orchestration engine has access to the current storage array, automatically collecting storage details directly from the current storage array; and when the data migration orchestration engine does not have access to the current storage array, generating user interface prompts to request manual input of storage details of the current storage array.

3. The non-transitory tangible computer readable storage medium of claim 2, wherein the storage details of the current storage array comprise:
a vendor name of a manufacturer of the current storage array;
an array serial number;
a Logical Unit Number of the storage volume; and
front end port details of a port used to access the storage volume on the current storage array.

4. The non-transitory tangible computer readable storage medium of claim 1, wherein capturing storage environment information of the target storage array comprises determining if the data migration orchestration engine has access to the target storage array;
when the data migration orchestration engine has access to the target storage array, automatically collecting storage details directly from the target storage array; and
when the data migration orchestration engine does not have access to the target storage array, generating user interface prompts to request manual input of storage details of the target storage array.

5. The non-transitory tangible computer readable storage medium of claim 1, wherein capturing storage environment information of the switch connecting the production server to the current storage array comprises determining if the data migration orchestration engine has access to the switch;
when the data migration orchestration engine has access to the switch, automatically collecting fabric details directly from the switch; and
when the data migration orchestration engine does not have access to the switch, generating user interface prompts to request manual input of fabric details of the switch.

6. The non-transitory tangible computer readable storage medium of claim 5, wherein the fabric details comprise:
active zoneset details;
virtual storage attached network details; and
active zone details.

7. The non-transitory tangible computer readable storage medium of claim 1, wherein capturing storage environment information of the production server associated with the storage volume comprises determining if the data migration orchestration engine has access to the production server;
when the data migration orchestration engine has access to the production server, automatically collecting production server details directly from the production server; and
when the data migration orchestration engine does not have access to the production server, generating user interface prompts to request manual input of production server details of the production server.

8. The non-transitory tangible computer readable storage medium of claim 7, wherein the production server details comprise:
operating system and patch details;
multipathing details; and
application details; and
Logical Unit Number (LUN) grouping details created based on application requirements.

9. The non-transitory tangible computer readable storage medium of claim 1, wherein analyzing the captured storage environment information to validate a target configuration of the target storage array comprises determining if the target storage array has sufficient capacity for the storage volume.

10. The non-transitory tangible computer readable storage medium of claim 1, wherein analyzing the captured storage environment information comprises analyzing Logical Unit Number (LUN) grouping details of one or more LUNs used by an application to access the storage volume, to identify LUNs that need to be created on the target storage array.

11. The non-transitory tangible computer readable storage medium of claim 1, wherein preparing instructions to the current storage array, the target storage array, the production server associated with the storage volume, and the fabric by a block data migration preparation module of the data migration orchestration engine further comprises generating an action plan for execution of the data migration operation and generating a set of roll-back tasks to be executed if the data migration operation is unsuccessful.

12. The non-transitory tangible computer readable storage medium of claim 11, wherein preparing instructions to the target storage array comprises creating a set of logical storage volumes on the target storage array.

13. The non-transitory tangible computer readable storage medium of claim 11, wherein preparing instructions to the target storage array comprises initiating replication of the storage volume from the source storage array to the target storage array prior to initiating the data migration operation.

14. The non-transitory tangible computer readable storage medium of claim 4, wherein the storage details of the target storage array comprise:
a vendor name of a manufacturer of the target storage array;
a target storage array serial number; and
front end port details of a port used to access the target storage array.

15. A non-transitory tangible computer readable storage medium having stored thereon a computer program for planning and coordinating block data migration between disparate storage systems, the computer program including a set of instructions which, when executed by a computer, cause the computer to perform a method comprising the steps of:
receiving an instruction, on a user interface of a data migration orchestration system, to initiate a data migration operation of a storage volume from a current storage array to a target storage array, the data migration orchestration having a data migration orchestration engine;
capturing storage environment information by a storage environment capture module of the data migration orchestration engine, the storage environment information including information about the current storage array, the target storage array, a production server associated with the storage volume, and a switch connecting the production server to the current storage array;
analyzing the captured storage environment information to validate a source configuration of the storage volume, a target configuration of the target storage array, and to create a ranked list of data migration technologies that can be used to implement the data migration operation;
preparing instructions to the current storage array, the target storage array, the production server associated with the storage volume, and the switch by a block data migration preparation module of the data migration orchestration engine; and
executing the block data migration operation by a block data migration execution module of the data migration orchestration engine by issuing the prepared instructions to the current storage array, the target storage array, the production server associated with the storage volume, and the fabric;

wherein analyzing the captured storage environment information to validate a source configuration of the storage volume comprises determining if an operating system version and patch version of the production server is current, and generating a report identifying required remediation details when the operating system version or patch version is not current.

16. The non-transitory tangible computer readable storage medium of claim 15, further comprising applying an update to the production server if the update is available, when the operating system version or patch version of the production server is not current.

17. A non-transitory tangible computer readable storage medium having stored thereon a computer program for planning and coordinating block data migration between disparate storage systems, the computer program including a set of instructions which, when executed by a computer, cause the computer to perform a method comprising the steps of:

receiving an instruction, on a user interface of a data migration orchestration system, to initiate a data migration operation of a storage volume from a current storage array to a target storage array, the data migration orchestration having a data migration orchestration engine;

capturing storage environment information by a storage environment capture module of the data migration orchestration engine, the storage environment information including information about the current storage array, the target storage array, a production server associated with the storage volume, and a switch connecting the production server to the current storage array;

analyzing the captured storage environment information to validate a source configuration of the storage volume, a target configuration of the target storage array, and to create a ranked list of data migration technologies that can be used to implement the data migration operation;

preparing instructions to the current storage array, the target storage array, the production server associated with the storage volume, and the switch by a block data migration preparation module of the data migration orchestration engine; and executing the block data migration operation by a block data migration execution module of the data migration orchestration engine by issuing the prepared instructions to the current storage array, the target storage array, the production server associated with the storage volume, and the fabric;

wherein analyzing the captured storage environment information to create a ranked list of data migration technologies that can be used to implement the data migration operation comprises:

ascertaining a first set of data migration technologies supported by the source storage array;

ascertaining a second set of data migration technologies supported by the target storage array;

comparing the first set of data migration technologies and second set of data migration technologies to determine a compatible set of data migration technologies; and creating a weighted list of compatible data migration technologies based on information in a migration method profiling database and a set of deciding factors.

18. The non-transitory tangible computer readable storage medium of claim 17, wherein the set of deciding factors is received by the data migration orchestration system via a menu-based user interface.

* * * * *